(12) United States Patent
Wu

(10) Patent No.: US 11,442,817 B2
(45) Date of Patent: *Sep. 13, 2022

(54) INTELLIGENT SCHEDULING OF BACKUPS

(71) Applicant: Rubrik, Inc., Palo Alto, CA (US)

(72) Inventor: Di Wu, East Palo Alto, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/287,130

(22) Filed: Feb. 27, 2019

(65) Prior Publication Data
US 2019/0266056 A1    Aug. 29, 2019

Related U.S. Application Data

(60) Provisional application No. 62/635,677, filed on Feb. 27, 2018.

(51) Int. Cl.
| | |
|---|---|
| G06F 9/44 | (2018.01) |
| G06F 11/14 | (2006.01) |
| G06F 9/48 | (2006.01) |
| G06F 9/50 | (2006.01) |
| G06F 9/38 | (2018.01) |
| G06F 9/455 | (2018.01) |
| G06N 20/00 | (2019.01) |

(52) U.S. Cl.
CPC ........ *G06F 11/1461* (2013.01); *G06F 9/3891* (2013.01); *G06F 9/45558* (2013.01); *G06F 9/4881* (2013.01); *G06F 9/5077* (2013.01); *G06F 11/1469* (2013.01); *G06N 20/00* (2019.01); *G06F 9/5083* (2013.01); *G06F 2009/4557* (2013.01); *G06F 2009/45562* (2013.01); *G06F 2009/45579* (2013.01); *G06F 2009/45591* (2013.01)

(58) Field of Classification Search
CPC ............... G06F 11/1461; G06F 9/3891; G06F 9/45558; G06F 9/4881; G06F 9/5077; G06F 11/1469; G06F 9/5083; G06F 2009/45562; G06F 2009/4557; G06F 2009/45579; G06F 2009/45591; G06N 20/00

See application file for complete search history.

(56) References Cited

U.S. PATENT DOCUMENTS

| | | |
|---|---|---|
| 8,959,509 B1 | 2/2015 | Sobel et al. |
| 9,305,068 B1 * | 4/2016 | Esposito ............... G06F 16/256 |

(Continued)

OTHER PUBLICATIONS

U.S. Appl. No. 16/287,199, filed Feb. 27, 2019, Intelligent Scheduling of Backups.

(Continued)

Primary Examiner — Hang Pan
(74) Attorney, Agent, or Firm — Holland & Hart LLP

(57) ABSTRACT

Normal virtual machine operation is observed to automatically determine patterns of resource utilization. Backup activities are then scheduled, taking into account these utilization patterns. For example, if a normally scheduled backup would occur during a busy period, it may be rescheduled to a less busy period. As another example, backups made by made opportunistically during less busy periods even if not required by the normal backup schedule, in order to alleviate backup demands during more busy periods.

21 Claims, 11 Drawing Sheets

(56) References Cited

U.S. PATENT DOCUMENTS

| | | | |
|---|---|---|---|
| 2005/0015641 A1* | 1/2005 | Alur | G06F 11/1458 |
| | | | 714/2 |
| 2008/0033991 A1* | 2/2008 | Basak | G06F 11/3452 |
| 2013/0262925 A1* | 10/2013 | Dhanalakoti | G06F 11/1461 |
| | | | 714/16 |
| 2014/0149696 A1* | 5/2014 | Frenkel | G06F 11/1469 |
| | | | 711/162 |
| 2016/0232440 A1* | 8/2016 | Gregor | G06N 3/0445 |
| 2017/0220407 A1 | 8/2017 | Estrada et al. | |
| 2019/0266016 A1 | 8/2019 | Wu | |

OTHER PUBLICATIONS

"U.S. Appl. No. 16/287,199, Non Final Office Action dated Jun. 9, 2020", 10 pages.

"U.S. Appl. No. 16/287,199, Response filed Nov. 9, 2020 to Non Final Office Action dated Jun. 9, 2020", 10 pages.

"U.S. Appl. No. 16/287,199, Final Office Action dated Dec. 14, 2020", 10 pages.

"U.S. Appl. No. 16/287,199, Response filed Mar. 12, 2021 to Final Office Action dated Dec. 14, 2020", 9 pages.

"U.S. Appl. No. 16/287,199, Non Final Office Action dated Jun. 1, 2021", 9 pages.

* cited by examiner

Service Schedule 222

| machine_user_id | machine_id | SLA |
|---|---|---|
| VM01 | m001 | standard VM |
| VM02 | m002 | standard VM |
| PM04 | m003 | standard PM |
| VM07 | m004 | high frequency |
| PM01 | m005 | short life |
| ... | | |

FIG. 3A

Job Queue 224

| job_id | start_time | job_type | job_info |
|---|---|---|---|
| 00001 | 0600 | pull snapshot | target = m001 |
| 00002 | 0600 | pull snapshot | target = m005 |
| 00003 | 0610 | replicate | target = m003 |
| 00004 | 0615 | run analytics | target = m002 |
| 00005 | 0615 | trash collection | xxx |
| ... | | | |

FIG. 3B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | |
| ... | | |

Image Table 228

| im_id | im_location |
|---|---|
| m001.im1 | ... |
| m001.im1-2 | |
| m001.im2-3 | |
| m001.im3-4 | |
| m001.im4-5 | |
| ... | |

FIG. 3C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | |
| ... | | |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4A

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im1, ..., m001.im4-5 |
| m001.ss6 | 20171002.0900 | ... |
| ... | | |
| m001.ss12 | 20171003.2100 | m001.im1, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | |
| m001.im11-12 | |

FIG. 4B

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ... m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | ... |
| ... | |
| m001.im11-12 | |
| m001.im5 | |

FIG. 4C

Snapshot Table 226

| ss_id | ss_time | im_list |
|---|---|---|
| m001.ss1 | 20171001.0300 | m001.im1 |
| m001.ss2 | 20171001.0900 | m001.im1, m001.im1-2 |
| m001.ss3 | 20171001.1500 | m001.im1, m001.im1-2, m001.im2-3 |
| m001.ss4 | 20171001.2100 | m001.im1, m001.im1-2, m001.im2-3, m001.im3-4 |
| m001.ss5 | 20171002.0300 | m001.im5 |
| m001.ss6 | 20171002.0900 | ... |
| ... | | |
| m001.ss12 | 20171003.2100 | m001.im5, ..., m001.im11-12 |

Image Table 228

| im_id | im_location |
|---|---|
| m001.im1 | ... |
| m001.im1-2 | |
| m001.im2-3 | |
| m001.im3-4 | |
| m001.im4-5 | |
| m001.im5-6 | |
| ... | ... |
| m001.im11-12 | |
| m001.im5 | |
| m001.im5-1 | |

INTELLIGENT SCHEDULING OF BACKUPS

CLAIM OF PRIORITY

This application claims the benefit of priority, under 35 U.S.C. Section 119(e), to Wu, U.S. Provisional Application No. 62/635,677, filed Feb. 27, 2018, entitled "INTELLIGENT SCHEDULING OF BACKUPS", which is incorporated herein by reference in its entirety.

TECHNICAL FIELD

The present invention generally relates to managing and storing data, for example for backup purposes.

BACKGROUND INFORMATION

The amount and type of data that is collected, analyzed and stored is increasing rapidly over time. The compute infrastructure used to handle this data is also becoming more complex, with more processing power and more portability. As a result, data management and storage are increasingly important. One aspect of this is reliable data backup and storage, and fast data recovery in cases of failure.

At the same time, virtualization allows virtual machines to be created and decoupled from the underlying physical hardware. For example, a hypervisor running on a physical host machine or server may be used to create one or more virtual machines that may each run the same or different operating systems, applications and corresponding data. In these cases, management of the compute infrastructure typically includes backup and retrieval of the virtual machines, in addition to just the application data. Various different platforms are offered for virtualization, including VMware, Microsoft Hyper-V, Microsoft Azure, GCP (Google Cloud Platform), Nutanix AHV, Linux KVM (Kernel-based Virtual Machine), and Xen.

However, backup of virtual machines typically involves temporarily stalling I/O operations of the virtual machine while the backup is taken, a phenomenon sometimes referred to as VM (virtual machine) stunting. If the backup takes a long time, VM stunting can have an impact on normal operation.

Thus, there is a need for better approaches to managing and storing data and virtual machines.

SUMMARY

In order to reduce the effects of VM stunting, normal VM operation is observed to automatically determine patterns of resource utilization. Backup activities are then scheduled, taking into account these utilization patterns. For example, if a normally scheduled backup would occur during a busy period, it may be rescheduled to a less busy period. As another example, backups made by made opportunistically during less busy periods even if not required by the normal backup schedule, in order to alleviate backup demands during more busy periods.

The resource utilization patterns preferably are automatically learned, for example by using statistics and regression or by using machine learning models. In some examples, the self-learning mechanism and resulting schedule of backups is continuously monitored in order to validate and improve results.

Other aspects include components, devices, systems, improvements, methods, processes, applications, computer readable mediums, and other technologies related to any of the above.

BRIEF DESCRIPTION OF THE DRAWINGS

FIGS. 3A-C are DMS tables that illustrate operation of the system of FIGS. 1-2, according to one embodiment.

FIGS. 4A-4D are DMS tables that illustrate updating of snapshot images, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

The concepts described above will be explained using a specific backup architecture. This is for convenience, and the concepts are not limited to this specific architecture.

Figure 1:
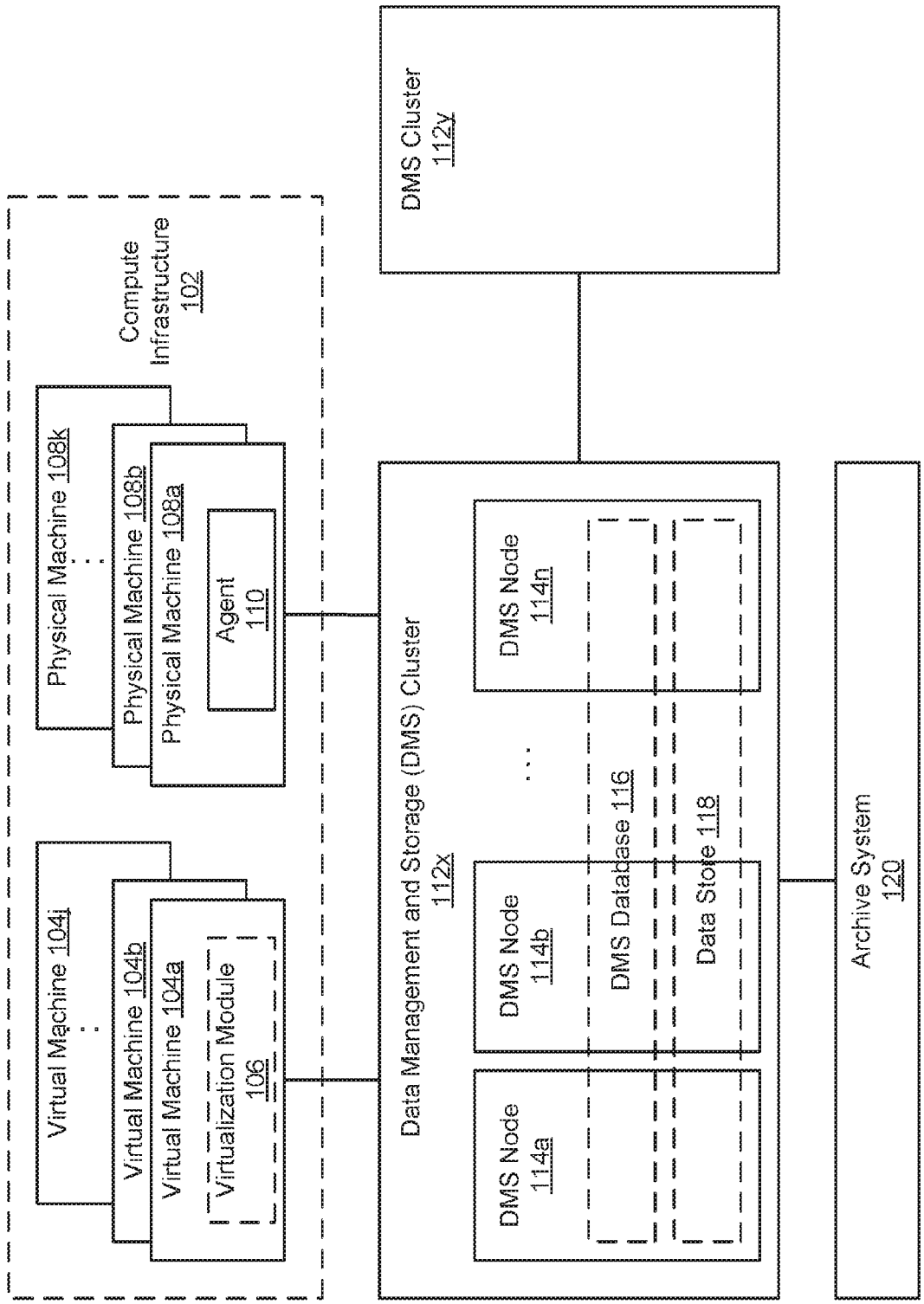
FIG. 1 is a block diagram of a system for managing and storing data, according to one embodiment.

FIG. 1 is a block diagram illustrating a system for managing and storing data, according to one embodiment. The system includes a data management and storage (DMS) cluster 112x, a secondary DMS cluster 112y and an archive system 120. The DMS system provides data management and storage services to a compute infrastructure 102, which may be used by an enterprise such as a corporation, university, or government agency. Many different types of compute infrastructures 102 are possible. Some examples include serving web pages, implementing e-commerce services and marketplaces, and providing compute resources for an enterprise's internal use. A specific example is a compute infrastructure for serving a web application, which is powered by a web server running on a VM and a SQL database. Another example is an NFS share with legal documents for a law firm that is continuously versioned. The compute infrastructure can include production environments, in addition to development or other environments.

In this example, the compute infrastructure 102 includes both virtual machines (VMs) 104a-j and physical machines (PMs) 108a-k. The VMs 104 can be based on different hypervisors. VMware, Microsoft Hyper-V, Microsoft Azure, GCP (Google Cloud Platform), Nutanix AHV, Linux KVM (Kernel-based Virtual Machine), and Xen are some examples. The physical machines 108a-n can also use different operating systems running various applications. Microsoft Windows running Microsoft SQL or Oracle databases, and Linux running web servers are some examples.

The DMS cluster 112 manages and stores data for the compute infrastructure 102. This can include the states of machines 104, 108, configuration settings of machines 104, 108, network configuration of machines 104, 108, data stored on machines 104, 108, and corresponding metadata. Example DMS services includes backup, recovery, replication, archival, and analytics services. The primary DMS cluster 112x enables near instant recovery of backup data. Derivative workloads (e.g., testing, development, and analytic workloads) may also use the DMS cluster 112x as a primary storage platform to read and/or possibly modify past versions of data.

In this example, to provide redundancy, two DMS clusters 112x-y are used. From time to time, data stored on DMS cluster 112x is replicated to DMS cluster 112y. If DMS cluster 112x fails, the DMS cluster 112y can be used to provide DMS services to the compute infrastructure 102 with minimal interruption.

Archive system 120 archives data for the computer infrastructure 102. The archive system 120 may be a cloud service. The archive system 120 receives data to be archived from the DMS clusters 112. The archived storage typically is "cold storage," meaning that more time is required to retrieve data stored in archive system 120. In contrast, the DMS clusters 112 provide much faster backup recovery.

The following examples illustrate operation of the DMS cluster 112 for backup and recovery of VMs 104. This is used as an example to facilitate the description. The same principles apply also to PMs 108 and to other DMS services.

Each DMS cluster 112 includes multiple peer DMS nodes 114a-n that operate autonomously to collectively provide the DMS services, including managing and storing data. A DMS node 114 includes a software stack, processor and data storage. DMS nodes 114 can be implemented as physical machines and/or as virtual machines. The DMS nodes 114 are interconnected with each other, for example, via cable, fiber, backplane, and/or network switch. The end user does not interact separately with each DMS node 114 but interacts with the DMS nodes 114a-n collectively as one entity, namely, the DMS cluster 112.

Preferably, the DMS nodes 114 are peers and each DMS node 114 includes the same functionality. The DMS cluster 112 automatically configures the DMS nodes 114 as new nodes are added or existing nodes are dropped or fail. In this way, the computing power and storage capacity of the DMS cluster 112 is scalable by adding more nodes 114.

The DMS cluster 112 includes a DMS database 116 and a data store 118. The DMS database 116 stores data structures used in providing the DMS services, as will be described in more detail in FIG. 2. In the following examples, these are shown as tables, but other data structures could also be used. The data store 118 contains the actual backup data from the compute infrastructure 102, for example snapshots of VMs or application files. Both the DMS database 116 and the data store 118 are distributed across the nodes 114, for example using Apache Cassandra and Atlas. That is, the DMS database 116 in its entirety is not stored at any one DMS node 114. Rather, each DMS node 114 stores a portion of the DMS database 116 but can access the entire DMS database. Data in the DMS database 116 preferably is replicated over multiple DMS nodes 114 to increase the fault tolerance and throughput, to optimize resource allocation, and/or to reduce response time. In one approach, each piece of data is stored on at least three different DMS nodes. The data store 118 has a similar structure, although data in the data store may or may not be stored redundantly. Accordingly, if any DMS node 114 fails, the full DMS database 116 and the full functionality of the DMS cluster 112 will still be available from the remaining DMS nodes. As a result, the DMS services can still be provided.

Considering each of the other components shown in FIG. 1, a virtual machine (VM) 104 is a software simulation of a computing system. The virtual machines 104 each provide a virtualized infrastructure that allows execution of operating systems as well as software applications such as a database application or a web server. A virtualization module 106 resides on a physical host (i.e., a physical computing system) (not shown), and creates and manages the virtual machines 104. The virtualization module 106 facilitates backups of virtual machines along with other virtual machine related tasks, such as cloning virtual machines, creating new virtual machines, monitoring the state of virtual machines, and moving virtual machines between physical hosts for load balancing purposes. In addition, the virtualization module 106 provides an interface for other computing devices to interface with the virtualized infrastructure. In the following example, the virtualization module 106 is assumed to have the capability to take snapshots of the VMs 104. An agent could also be installed to facilitate DMS services for the virtual machines 104.

A physical machine 108 is a physical computing system that allows execution of operating systems as well as software applications such as a database application or a web server. In the following example, an agent 110 is installed on the physical machines 108 to facilitate DMS services for the physical machines.

The components shown in FIG. 1 also include storage devices, which for example can be a hard disk drive (HDD), a magnetic tape drive, a solid-state drive (SSD), or a disk array (e.g., a storage area network (SAN) storage device, or a networked-attached storage (NAS) device). A storage device can be separate from or integrated with a physical machine.

The components in FIG. 1 are interconnected with each other via networks, although many different types of networks could be used. In some cases, the relevant network uses standard communications technologies and/or protocols and can include the Internet, local area networks, and other types of private or public networks. The components can also be connected using custom and/or dedicated data communications technologies.

Figure 2:
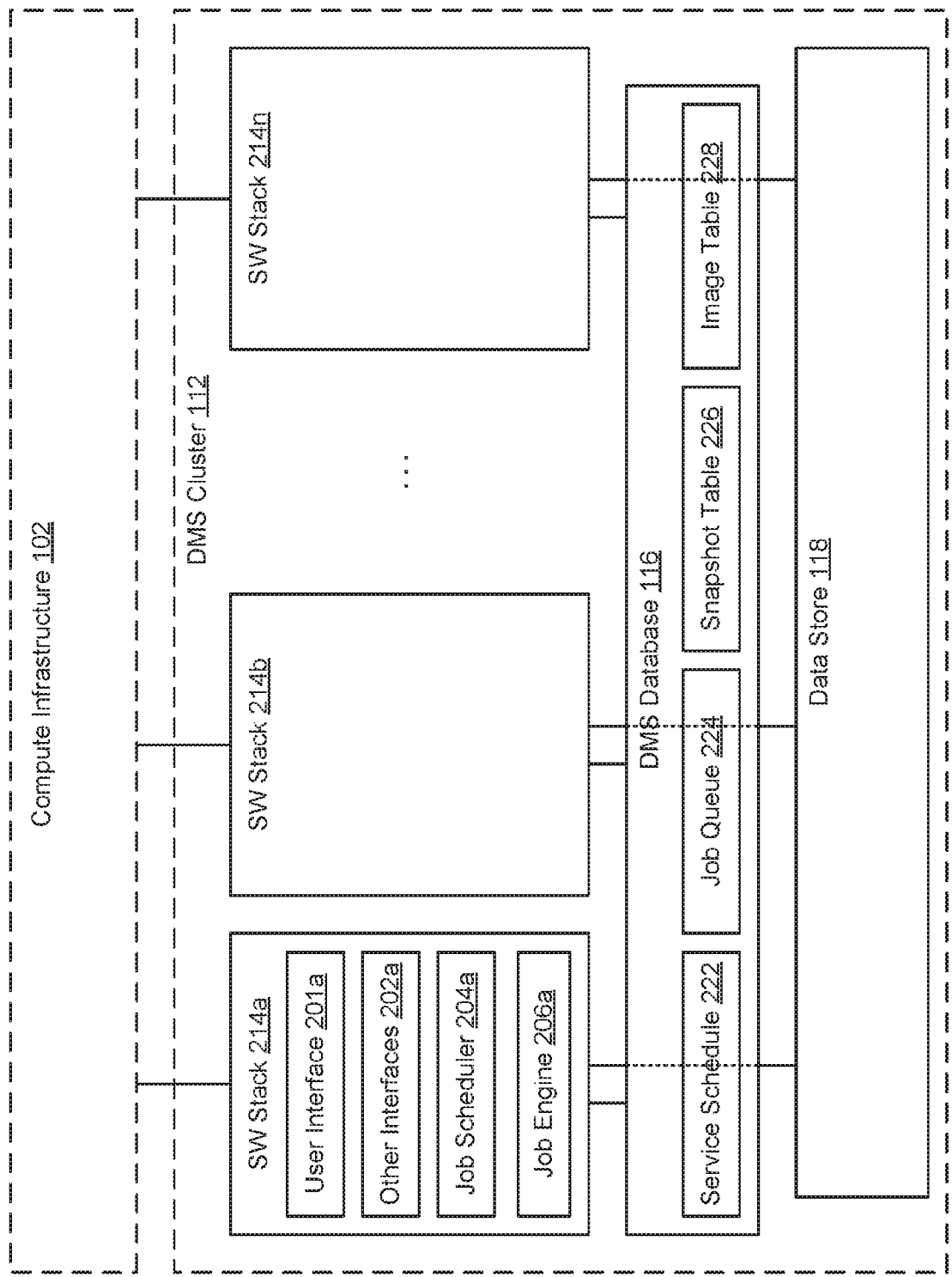
FIG. 2 is a logical block diagram of a data management and storage (DMS) cluster, according to one embodiment.

FIG. 2 is a logical block diagram illustrating an example DMS cluster 112, according to one embodiment. This logical view shows the software stack 214a-n for each of the DMS nodes 114a-n of FIG. 1. Also shown are the DMS database 116 and data store 118, which are distributed across the DMS nodes 114a-n. Preferably, the software stack 214 for each DMS node 114 is the same. This stack 214a is shown only for node 114a in FIG. 2. The stack 214a includes a user interface 201a, other interfaces 202a, job scheduler 204a and job engine 206a. This stack is replicated on each of the software stacks 214b-n for the other DMS nodes. The DMS database 116 includes the following data structures: a service schedule 222, a job queue 224, a snapshot table 226 and an image table 228. In the following examples, these are shown as tables, but other data structures could also be used.

The user interface 201 allows users to interact with the DMS cluster 112. Preferably, each of the DMS nodes includes a user interface 201, and any of the user interfaces can be used to access the DMS cluster 112. This way, if one DMS node fails, any of the other nodes can still provide a user interface. The user interface 201 can be used to define what services should be performed at what time for which machines in the compute infrastructure (e.g., the frequency of backup for each machine in the compute infrastructure). In FIG. 2, this information is stored in the service schedule 222. The user interface 201 can also be used to allow the user to run diagnostics, generate reports or calculate analytics.

The software stack 214 also includes other interfaces 202. For example, there is an interface 202 to the computer infrastructure 102, through which the DMS nodes 114 may make requests to the virtualization module 106 and/or the agent 110. The software stack may also include an agent server (not shown) to interface with the computer infrastructure 102. In one implementation, the VM 104 can communicate with a DMS node 114 using a distributed file system protocol (e.g., Network File System (NFS) Version 3) via the virtualization module 106. The distributed file system protocol allows the VM 104 to access, read, write, or modify files stored on the DMS node 114 as if the files were locally stored on the physical machine supporting the VM 104. The distributed file system protocol also allows the VM 104 to mount a directory or a portion of a file system located within the DMS node 114. There are also interfaces to the DMS database 116 and the data store 118, as well as network interfaces such as to the secondary DMS cluster 112$y$ and to the archive system 120.

The job schedulers 204 create jobs to be processed by the job engines 206. These jobs are posted to the job queue 224. Examples of jobs are pull snapshot (take a snapshot of a machine), replicate (to the secondary DMS cluster), archive, etc. Some of these jobs are determined according to the service schedule 222. For example, if a certain machine is to be backed up every 6 hours, then a job scheduler will post a "pull snapshot" job into the job queue 224 at the appropriate 6-hour intervals. Other jobs, such as internal garbage collection or updating of incremental backups, are generated according to the DMS cluster's operation separate from the service schedule 222. More intelligent job schedulers 204 can schedule jobs to take advantage of resource utilization patterns in the computer infrastructure 102, while still meeting the requirements of the service schedule 222.

The job schedulers 204 preferably are decentralized and execute without a master. The overall job scheduling function for the DMS cluster 112 is executed by the multiple job schedulers 204 running on different DMS nodes. Preferably, each job scheduler 204 can contribute to the overall job queue 224 and no one job scheduler 204 is responsible for the entire queue. The job schedulers 204 may include a fault tolerant capability, in which jobs affected by node failures are recovered and rescheduled for re-execution.

The job engines 206 process the jobs in the job queue 224. When a DMS node is ready for a new job, it pulls a job from the job queue 224, which is then executed by the job engine 206. Preferably, the job engines 206 all have access to the entire job queue 224 and operate autonomously. Thus, a job scheduler 204$j$ from one node might post a job, which is then pulled from the queue and executed by a job engine 206$k$ from a different node.

In some cases, a specific job is assigned to or has preference for a particular DMS node (or group of nodes) to execute. For example, if a snapshot for a VM is stored in the section of the data store 118 implemented on a particular node 114$x$, then it may be advantageous for the job engine 206$x$ on that node to pull the next snapshot of the VM if that process includes comparing the two snapshots. As another example, if the previous snapshot is stored redundantly on three different nodes, then the preference may be for any of those three nodes.

The snapshot table 226 and image table 228 are data structures that index the snapshots captured by the DMS cluster 112. In this example, snapshots are decomposed into images, which are stored in the data store 118. The snapshot table 226 describes which images make up each snapshot. For example, the snapshot of machine x taken at time y can be constructed from the images a, b, c. The image table is an index of images to their location in the data store 118. For example, image a is stored at location aaa of the data store 118, image b is stored at location bbb, etc. More details of example implementations are provided in FIG. 3 below.

DMS database 116 also stores metadata information for the data in the data store 118. The metadata information may include file names, file sizes, permissions for files, and various times such as when the file was created or last modified.

FIGS. 3-4 illustrate operation of the DMS system shown in FIGS. 1-2. FIG. 3A is an example of a service schedule 222. The service schedule defines which services should be performed on what machines at what time. It can be set up by the user via the user interface, automatically generated, or even populated through a discovery process. In this example, each row of the service schedule 222 defines the services for a particular machine. The machine is identified by machine_user_id, which is the ID of the machine in the compute infrastructure. It points to the location of the machine in the user space, so that the DMS cluster can find the machine in the compute infrastructure. In this example, there is a mix of virtual machines (VMxx) and physical machines (PMxx). The machines are also identified by machine_id, which is a unique ID used internally by the DM cluster.

The services to be performed are defined in the SLA (service level agreement) column. Here, the different SLAs are identified by text: standard VM is standard service for virtual machines. Each SLA includes a set of DMS policies (e.g., a backup policy, a replication policy, or an archival policy) that define the services for that SLA. For example, "standard VM" might include the following policies:

Backup policy: The following backups must be available on the primary DMS cluster 112$x$: every 6 hours for the prior 2 days, every 1 day for the prior 30 days, every 1 month for the prior 12 months.

Replication policy: The backups on the primary DMS cluster for the prior 2 days must also be replicated on the secondary DMS cluster 112$y$.

Archive policy: Backups that are more than 30 days old may be moved to the archive system 120.

The underlines indicate quantities that are most likely to vary in defining different levels of service. For example, "high frequency" service may include more frequent backups than standard. For "short life" service, backups are not kept for as long as standard.

From the service schedule 222, the job schedulers 204 populate the job queue 224. FIG. 3B is an example of a job queue 224. Each row is a separate job. job id identifies a job and start_time is the scheduled start time for the job. job_type defines the job to be performed and job_info includes additional information for the job. Job 00001 is a job to "pull snapshot" (i.e., take backup) of machine m001. Job 00003 is a job to replicate the backup for machine m003 to the secondary DMS cluster. Job 00004 runs analytics on the backup for machine m002. Job 00005 is an internal garbage collection job. The jobs in queue 224 are accessible by any of the job engines 206, although some may be assigned or preferred to specific DMS nodes.

FIG. 3C are examples of a snapshot table 226 and image table 228, illustrating a series of backups for a machine m001. Each row of the snapshot table is a different snapshot and each row of the image table is a different image. The snapshot is whatever is being backed up at that point in time. In the nomenclature of FIG. 3C, m001.ss1 is a snapshot of machine m001 taken at time t1. In the suffix ".ss1", the .ss indicates this is a snapshot and the 1 indicates the time t1. m001.ss2 is a snapshot of machine m001 taken at time t2, and so on. Images are what is saved in the data store 118. For example, the snapshot m001.ss2 taken at time t2 may not be saved as a full backup. Rather, it may be composed of a full backup of snapshot m001.ss1 taken at time t1 plus the incremental difference between the snapshots at times t1 and t2. The full backup of snapshot m001.ss1 is denoted as m001.im1, where ".im" indicates this is an image and "I" indicates this is a full image of the snapshot at time t1. The incremental difference is m001.im 1-2 where "1-2" indicates this is an incremental image of the difference between snapshot m001.ss1 and snapshot m001.ss2.

In this example, the service schedule indicates that machine m001 should be backed up once every 6 hours. These backups occur at 3 am, 9 am, 3 pm and 9 pm of each day. The first backup occurs on Oct. 1, 2017 at 3 am (time t1) and creates the top rows in the snapshot table 226 and image table 228. In the snapshot table 226, the ss_id is the snapshot ID which is m001.ss1. The ss_time is a timestamp of the snapshot, which is Oct. 1, 2017 at 3 am. im list is the list of images used to compose the snapshot. Because this is the first snapshot taken, a full image of the snapshot is saved (m001.im1). The image table 228 shows where this image is saved in the data store 118.

On Oct. 1, 2017 at 9 am (time t2), a second backup of machine m001 is made. This results in the second row of the snapshot table for snapshot m001_ss2. The image list of this snapshot is m001.im1 and m001.im1-2. That is, the snapshot m001_ss2 is composed of the base full image m001.im1 combined with the incremental image m001.im1-2. The new incremental image m001.im1-2 is stored in data store 118, with a corresponding entry in the image table 228. This process continues every 6 hours as additional snapshots are made.

For virtual machines, pulling a snapshot for the VM typically includes the following steps: freezing the VM and taking a snapshot of the VM, transferring the snapshot (or the incremental differences) and releasing the VM. For example, the DMS cluster may receive a virtual disk file that includes the snapshot of the VM. The backup process may also include deduplication, compression/decompression and/or encryption/decryption.

One of the side-effects of taking VM snapshots in many commercial hypervisors is a phenomenon referred to as "VM stunting." This is a user noticeable lag when I/O operations of the guest machine are stalled in order to capture a consistent snapshot. The duration of the system non-responsiveness grows linearly with the amount of changed data blocks since the last incremental snapshot To reduce VM stunting, the following can be performed. A continuous analytic process automatically observes and learns the resource utilization patterns of the hypervisor systems over time. The learned resource utilization patterns and other heuristics are used to identify cyclical gaps in resource utilization that are good maintenance window candidates, and also to identify periods of high resource contention (blackout windows for maintenance). Incremental VM snapshots may be performed during predicted opportunities. This can have various benefits. It may allow the job scheduler to defer a scheduled backup past a predicted blackout window while still meeting the service schedule. It may allow the job scheduler to push back a scheduled backup to the next predicted opportunistic window, which reduces the overall system resource contention. It may generate additional incremental snapshots to reduce the duration of VM stunting for the next scheduled snapshot. In addition, a self-learning mechanism may be used to allow the analytic process to continuously self-validate its own predictions and retrain its internal machine learning model in an effort to better predict future opportunity and blackout windows. Instead of blindly following manually defined maintenance windows, the system learns from observations and acts accordingly.

In one approach, the system reads performance counters from the hypervisors. Statistics and regressions may be performed to determine opportunistic windows and blackout windows. Alternatively, machine learning models may be trained to determine opportunistic windows and blackout windows. Both inter-day and intra-day trends may be learned. Based on these observations, the system proposes opportunistic windows and blackout windows, which are used by the job scheduler to schedule jobs. The performance can be validated against observations of the actual resource utilization and adjusted accordingly.

As an example implementation, the system may connect to the hypervisor machines in order to periodically pull performance metrics from the host machines. Examples of performance metrics include CPU, memory, disk IO, and network utilization. The performance metrics preferably are retrieved on a regular interval, every 30 mins for example. A limited history of these statistics is stored at both the hypervisor and virtual machine level (30 day retention, for example). For each host machine, a long short-term memory model is trained for each of the performance metrics recorded. These models are continuously updated as new data points are collected, so the models are adapting to the real data. The job scheduler will propose a few possible schedules that satisfy the service schedule. The trained models are used to predict the CPU, memory, disk IO, and network utilization during the possible time windows and to propose and/or choose the backup schedule that has the least resource contention.

Returning to the figures, from time to time, these tables and the corresponding data are updated as various snapshots and images are no longer needed or can be consolidated. FIGS. 4A-4D show an example of this. FIG. 4A shows the snapshot table and image table after backups have been taken for 3 days using the process described in FIG. 3. However, if the service schedule requires 6-hour backups only for the past 2 days, then the 6-hour backups for the first day October 1 are no longer needed. The snapshot m001.ss1 is still needed because the service schedule requires daily backups, but snapshots .ss2, .ss3 and .ss4 can be deleted and are removed from the snapshot table, as indicated by the cross-hatching in FIG. 4B. However, the incremental images .im1-2, .im2-3 and .im3-4 are still required to build the remaining snapshots.

In FIG. 4C, the base image is updated from .im1 to .im5. That is, a full image of snapshot 5 is created from the existing images. This is a new row at the bottom of the image table 228. The im_list for snapshots .ss5 to .ss12 are also updated to stem from this new base image .im5. As a result, the incremental images .im1-2, .im2-3, .im3-4 and .im4-5 are no longer required and they can be deleted from the data store and from the image table 228. However, the data store now contains two full images: .im1 and .im5. Full images are usually much larger than incremental images. This redundancy can be addressed by creating a backwards incremental image .im5-1, shown in FIG. 4D as a new row in the image table 228. With the addition of this backwards incremental image, the full image .im1 is no longer needed.

The description above is just one example. The various data structures may be defined in other ways and may contain additional or different information.

Figure 5:
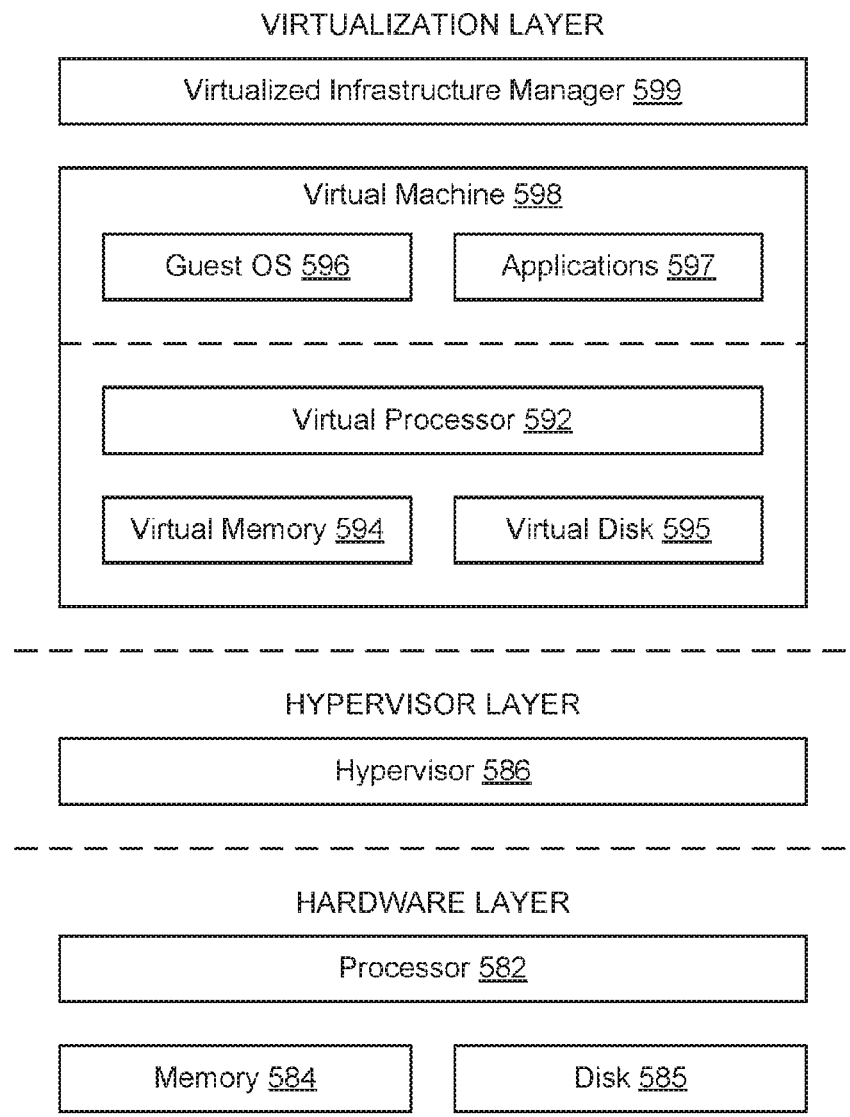
FIG. 5 is a block diagram of a virtual machine, according to one embodiment.

FIG. 5 is a block diagram of a server for a VM platform, according to one embodiment. The server includes hardware-level components and software-level components. The hardware-level components include one or more processors 582, one or more memory 584, and one or more storage devices 585. The software-level components include a hypervisor 586, a virtualized infrastructure manager 599, and one or more virtual machines 598. The hypervisor 586 may be a native hypervisor or a hosted hypervisor. The hypervisor 586 may provide a virtual operating platform for running one or more virtual machines 598. Virtual machine 598 includes a virtual processor 592, a virtual memory 594, and a virtual disk 595. The virtual disk 595 may comprise a file stored within the physical disks 585. In one example, a virtual machine may include multiple virtual disks, with each virtual disk associated with a different file stored on the physical disks 585. Virtual machine 598 may include a guest operating system 596 that runs one or more applications, such as application 597. Different virtual machines may run different operating systems. The virtual machine 598 may load and execute an operating system 596 and applications 597 from the virtual memory 594. The operating system 596 and applications 597 used by the virtual machine 598 may be stored using the virtual disk 595. The virtual machine 598 may be stored as a set of files including (a) a virtual disk file for storing the contents of a virtual disk and (b) a virtual machine configuration file for storing configuration settings for the virtual machine. The configuration settings may include the number of virtual processors 592 (e.g., four virtual CPUs), the size of a virtual memory 594, and the size of a virtual disk 595 (e.g., a 10 GB virtual disk) for the virtual machine 595.

The virtualized infrastructure manager 599 may run on a virtual machine or natively on the server. The virtualized infrastructure manager 599 corresponds to the virtualization module 106 above and may provide a centralized platform for managing a virtualized infrastructure that includes a plurality of virtual machines. The virtualized infrastructure manager 599 may manage the provisioning of virtual machines running within the virtualized infrastructure and provide an interface to computing devices interacting with the virtualized infrastructure. The virtualized infrastructure manager 599 may perform various virtualized infrastructure related tasks, such as cloning virtual machines, creating new virtual machines, monitoring the state of virtual machines, and facilitating backups of virtual machines.

Figure 6:
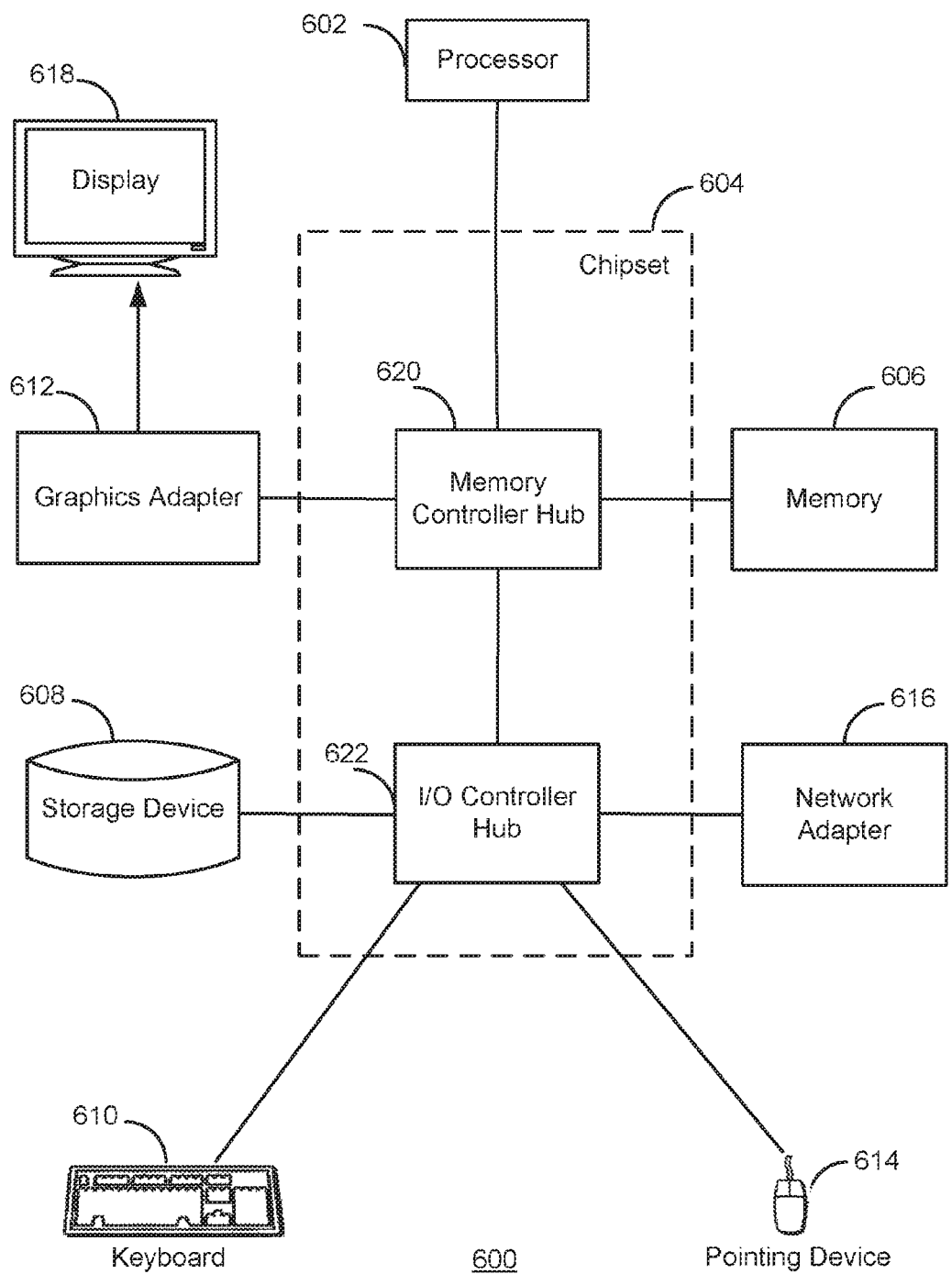
FIG. 6 is a block diagram of a computer system suitable for use in a DMS system, according to one embodiment.

FIG. 6 is a high-level block diagram illustrating an example of a computer system 600 for use as one or more of the components shown above, according to one embodiment. Illustrated are at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display device 618 is coupled to the graphics adapter 612. A storage device 608, keyboard 610, pointing device 614, and network adapter 616 are coupled to the I/O controller hub 622. Other embodiments of the computer 600 have different architectures. For example, the memory 606 is directly coupled to the processor 602 in some embodiments.

The storage device 608 includes one or more non-transitory computer-readable storage media such as a hard drive, compact disk read-only memory (CD-ROM), DVD, or a solid-state memory device. The memory 606 holds instructions and data used by the processor 602. The pointing device 614 is used in combination with the keyboard 610 to input data into the computer system 600. The graphics adapter 612 displays images and other information on the display device 618. In some embodiments, the display device 618 includes a touch screen capability for receiving user input and selections. The network adapter 616 couples the computer system 600 to a network. Some embodiments of the computer 600 have different and/or other components than those shown in FIG. 6. For example, the virtual machine 102, the physical machine 104, and/or the DMS node 110 in FIG. 1 can be formed of multiple blade servers and lack a display device, keyboard, and other components.

The computer 600 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for scheduling a backup of a set of virtual machines, the method comprising:
monitoring resource utilization metrics of the set of virtual machines;
training a model based on the monitored resource utilization metrics;
using the trained model, determining a plurality of opportunistic windows of reduced resource utilization for the set of virtual machines and a plurality of blackout windows of increased resource utilization for the set of virtual machines;
identifying, based at least in part on a service schedule for the set of virtual machines, that the backup for the set of virtual machines would occur at least partially during a blackout window of the plurality of blackout windows determined via the trained model;
identifying an opportunistic window, of the plurality of opportunistic windows determined via the trained model, as a substitute for the blackout window; and
scheduling, based at least in part on identifying that the backup would occur at least partially during the blackout window, the backup of the set of virtual machines to occur during the opportunistic window identified as the substitute for the blackout window.

2. The method of claim 1, wherein monitoring resource utilization metrics by the set of virtual machines includes running a continuous analytic process to observe and learn resource utilization patterns of a hypervisor managing the set of virtual machines.

3. The method of claim 2, wherein the resource utilization patterns identify cyclical gaps in the resource utilization to identify and predict the plurality of opportunistic windows of reduced resource utilization.

4. The method of claim 3, wherein incremental snapshots of the set of virtual machines are scheduled to be performed during one or more of the plurality of opportunistic windows of reduced resource utilization.

5. The method of claim 2, wherein the resource utilization patterns identify cyclical gaps in the resource utilization to identify and predict the plurality of blackout windows of high resource contention.

6. The method of claim 5, wherein scheduling the backup further comprises:
deferring the backup past the blackout window while still meeting a maintenance service schedule.

7. The method of claim 1, further comprising updating the model as new resource utilization metrics are collected.

8. A system for scheduling a backup of a set of virtual machines, the system comprising:
processors; and
a memory storing instructions that, when executed by at least one processor among the processors, cause the system to perform operations comprising, at least:
monitoring resource utilization metrics of the set of virtual machines;
training a model based on the monitored resource utilization metrics;
using the trained model, determining a plurality of opportunistic windows of reduced resource utilization for the set of virtual machines and a plurality of blackout windows of increased resource utilization for the set of virtual machines;
identifying, based at least in part on a service schedule for the set of virtual machines, that the backup for the set of virtual machines would occur at least partially during a blackout window of the plurality of blackout windows determined via the trained model;
identifying an opportunistic window, of the plurality of opportunistic windows determined via the trained model, as a substitute for the blackout window; and
scheduling, based at least in part on identifying that the backup would occur at least partially during the blackout window, the backup of the set of virtual machines to occur during the opportunistic window identified as the substitute for the blackout window.

9. The system of claim 8, wherein monitoring resource utilization metrics by the set of virtual machines includes running a continuous analytic process to observe and learn resource utilization patterns of a hypervisor managing the set of virtual machines.

10. The system of claim 9, wherein the resource utilization patterns identify cyclical gaps in the resource utilization to identify and predict the plurality of opportunistic windows of reduced resource utilization.

11. The system of claim 10, wherein the operations further comprise scheduling incremental snapshots of the set of virtual machines for performance during one or more of the plurality of opportunistic windows of reduced resource utilization.

12. The system of claim 9, wherein the resource utilization patterns identify cyclical gaps in the resource utilization to identify and predict the plurality of blackout windows of high resource contention.

13. The system of claim 12, wherein the operations to schedule the backup further comprise:
deferring the backup past the blackout window while still meeting a maintenance service schedule.

14. The system of claim 8, wherein the operations further comprise updating the model as new resource utilization metrics are collected.

15. A non-transitory machine-readable medium including instructions which, when read by a machine, cause the machine to perform operations including, at least:
monitoring resource utilization metrics of a set of virtual machines;
training a model based on the monitored resource utilization metrics;
using the trained model, determining a plurality of opportunistic windows of reduced resource utilization for the set of virtual machines and a plurality of blackout windows of increased resource utilization for the set of virtual machines;
identifying, based at least in part on a service schedule for the set of virtual machines, that a backup for the set of virtual machines would occur at least partially during a blackout window of the plurality of blackout windows determined via the trained model:
identifying an opportunistic window, of the plurality of opportunistic windows determined via the trained model, as a substitute for the blackout window; and
scheduling, based at least in part on identifying that the backup would occur at least partially during the blackout window, the backup of the set of virtual machines to occur during the opportunistic window identified as the substitute for the blackout window.

16. The medium of claim 15, wherein monitoring resource utilization metrics by the set of virtual machines includes running a continuous analytic process to observe and learn resource utilization patterns of a hypervisor managing the set of virtual machines.

17. The medium of claim 16, wherein the resource utilization patterns identify cyclical gaps in the resource utilization to identify and predict the plurality of opportunistic windows of reduced resource utilization.

18. The medium of claim 17, wherein the operations further comprise scheduling incremental snapshots of the set of virtual machines for performance during one or more of the plurality of opportunistic windows of reduced resource utilization.

19. The medium of claim 16, wherein the resource utilization patterns identify cyclical gaps in the resource utilization to identify and predict the plurality of blackout windows of high resource contention.

20. The medium of claim 19, wherein the operations to schedule the backup further comprise:
deferring the backup past the blackout window while still meeting a maintenance service schedule.

21. The medium of claim 15, wherein the operations further comprise updating the model as new resource utilization metrics are collected.

* * * * *